US008534407B2

(12) United States Patent
Koda et al.

(10) Patent No.: US 8,534,407 B2
(45) Date of Patent: Sep. 17, 2013

(54) SEAT RAIL OF MOTORCYCLE

(75) Inventors: Toshihiro Koda, Wako (JP); Hirotoshi Inui, Wako (JP); Yohei Kawasaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 449 days.

(21) Appl. No.: 13/059,142

(22) PCT Filed: Jul. 7, 2009

(86) PCT No.: PCT/JP2009/062343
§ 371 (c)(1),
(2), (4) Date: Feb. 15, 2011

(87) PCT Pub. No.: WO2010/024045
PCT Pub. Date: Mar. 4, 2010

(65) Prior Publication Data
US 2011/0147561 A1 Jun. 23, 2011

(30) Foreign Application Priority Data
Aug. 27, 2008 (JP) .................. 2008-218827

(51) Int. Cl.
*B62D 25/16* (2006.01)
(52) U.S. Cl.
USPC .......................... 180/219; 248/429

(58) Field of Classification Search
USPC .......................... 180/219; 248/429
See application file for complete search history.

(56) References Cited

U.S. PATENT DOCUMENTS

| 6,318,743 B1 * | 11/2001 | Nakashima et al. | 280/152.1 |
| 7,607,712 B2 * | 10/2009 | Suita et al. | 296/78.1 |
| 7,942,226 B2 * | 5/2011 | Nishizawa et al. | 180/219 |
| 8,398,144 B2 * | 3/2013 | Nord et al. | 296/65.13 |

FOREIGN PATENT DOCUMENTS

| JP | 01-317886 | 12/1989 |
| JP | 10-218065 | 8/1998 |
| JP | 2001-071961 | 3/2001 |
| JP | 2004-106609 | 4/2004 |
| JP | 2006-232166 | 9/2006 |
| JP | 2007-261587 | 10/2007 |

* cited by examiner

*Primary Examiner* — Tony Winner
*Assistant Examiner* — Jacob Knutson
(74) *Attorney, Agent, or Firm* — Squire Sanders (US) LLP

(57) ABSTRACT

Disclosed is a seat rail (30) of a motorcycle having a pair of left and right rail sections (45L, 45R) which do not have a tendency to store water and which have a sufficient rigidity. Each rail section comprises a first groove section (64) and a second groove section (65). A drain hole (71) for draining the water stored at the bottom (69) of the second groove section downward is formed in each rail.

3 Claims, 12 Drawing Sheets

FIG.4
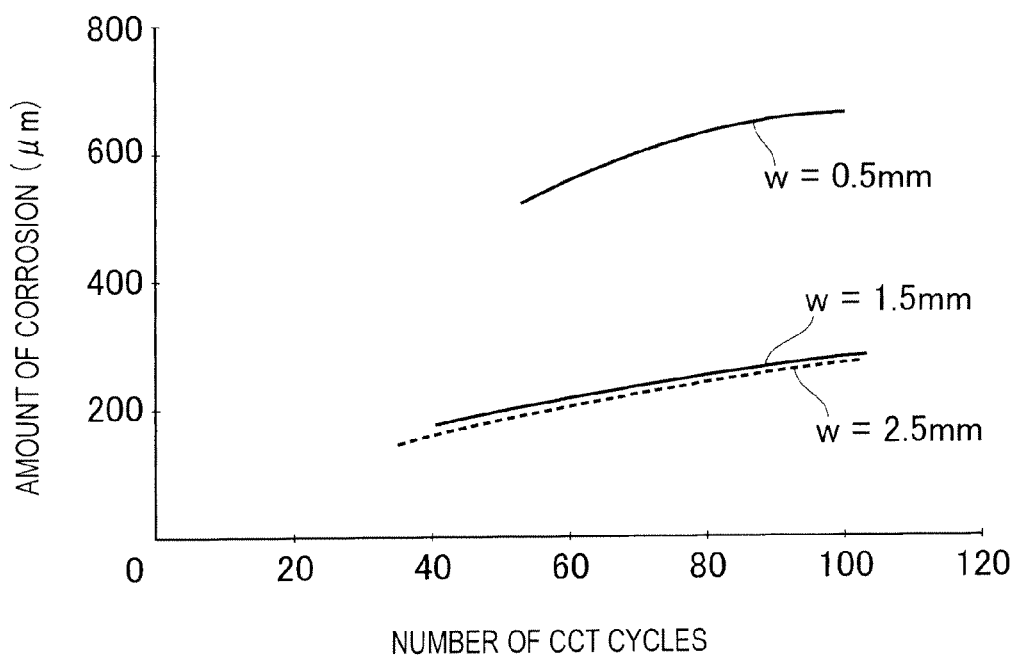
(a)
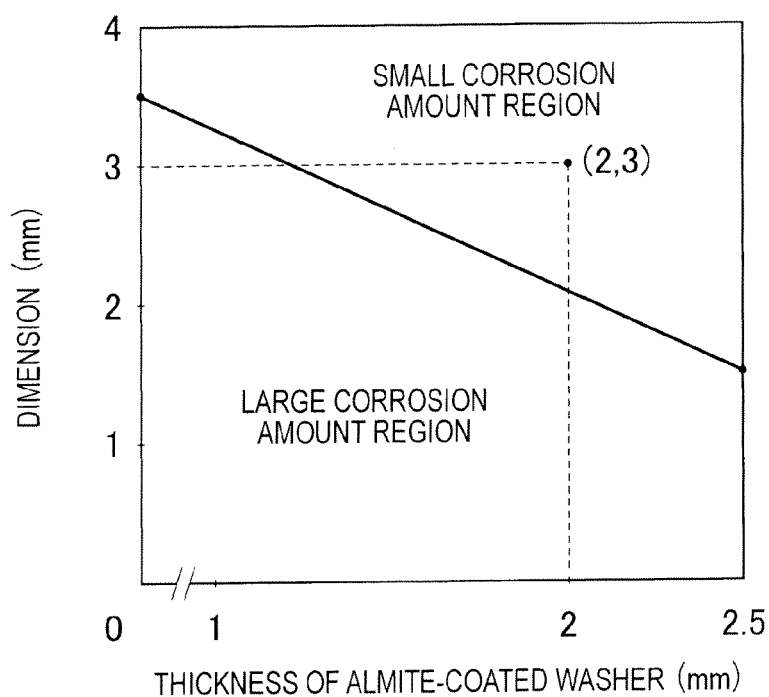
(b)

FIG.14
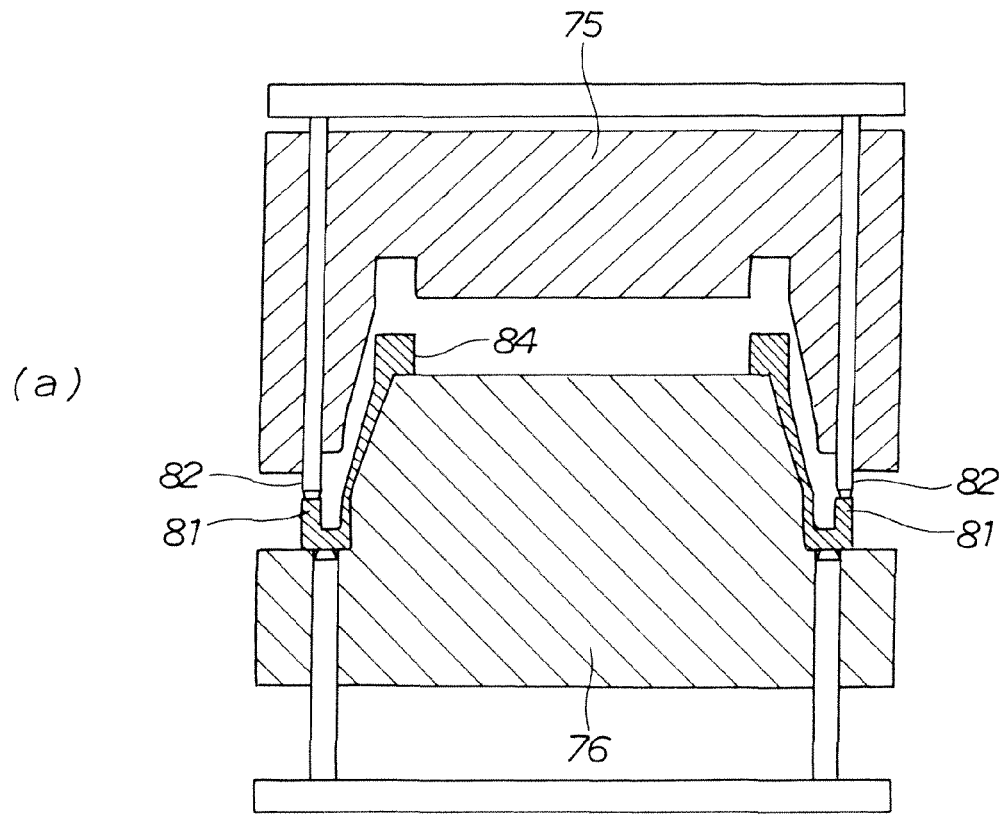
(a)
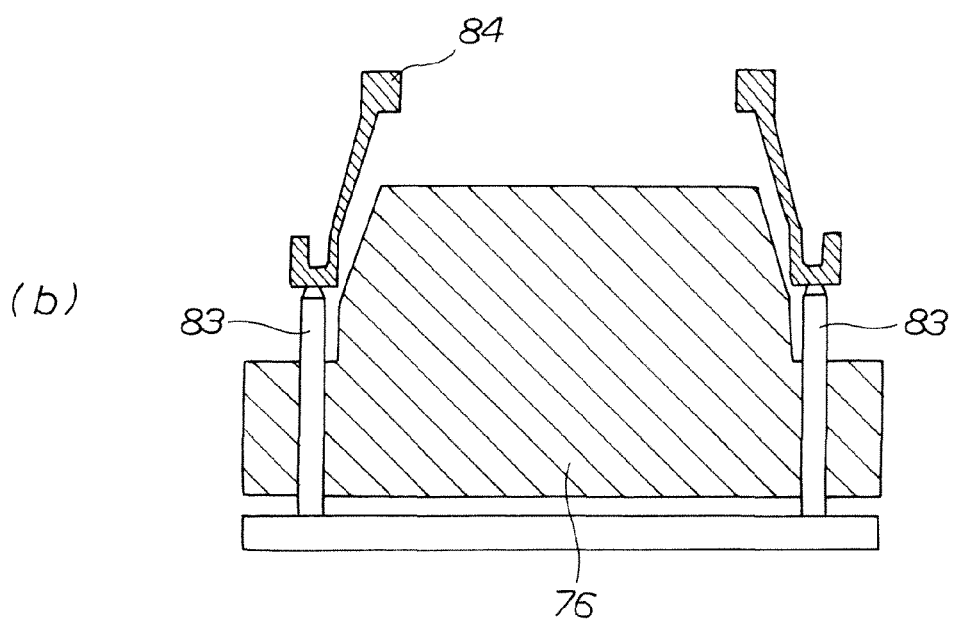
(b)

SEAT RAIL OF MOTORCYCLE

TECHNICAL FIELD

The present invention relates generally to motorcycle seat rails, and more particularly motorcycle seat rails made by casting.

BACKGROUND ART

Many of the conventionally-known automotive two-wheeled vehicles or motorcycles employ a structure where a seat rail extends from a vehicle body frame and a seat is supported on the seat rail. Among the conventionally-known motorcycle seat rails are ones made of pipes, plates, etc. as well as ones made by casting as disclosed, for example, in Japanese Patent Application Laid-Open Publication No. 2007-261587 ("patent literature 1").

As disclosed in patent literature 1, a seat frame, which constitutes the seat rail, is made by die-casting and extends obliquely rearward and upward from a rear arm bracket that is a rear-part member of the vehicle body frame.

The seat frame comprises left and right rail sections interconnected at their upper ends by a cross member. Each of the rail sections includes a large-thickness base portion, an extension portion extending from the large-thickness base portion, and a large-thickness edge portion formed at the lower end of the extension portion.

The seat frame has a generally U sectional shape opening downward, and thus, it can be readily released from a mold; particularly, the seat frame has a sectional configuration suited for die-casting. As loads of a passenger and goods onboard act downwardly on the seat frame, stress would increase in the edge portion. As measures against such a stress increase, the edge portion is formed to have a large thickness as noted above in order to provide an increased sectional area so that the stress increase can be limited to below a predetermined level. Namely, it is effective to increase the thickness of the edge portion.

So far, the dominating seat frames of this type have been ones made by die-casting an aluminum alloy (i.e., aluminum-alloy die-cast seat frames), because such an aluminum alloy can achieve a lighter weight than an iron-based alloy.

In recent years, more and more seat frames made by die-casting a magnesium alloy (i.e., magnesium-alloy die-cast seat frames) are being brought into practical use, for purposes of further weight reduction etc. Magnesium has a high specific strength and superior workability and vibration absorbing performance as compared to aluminum. However, because a magnesium alloy is easily subject to oxidation, it took a long time to establish a technique for making a seat frame by die-casting a magnesium alloy, and thus, practical realization of a seat frame made by die-casting a magnesium alloy has been delayed until recent years.

The following explain specific gravities and Young's moduli of such an aluminum-alloy die-cast seat frame and magnesium-alloy die-cast seat frame, with reference to Table 1 below.

TABLE 1

| Name of Alloy | Specific Gravity | Young's Modulus |
| --- | --- | --- |
| Aluminum-alloy Die-cast | ADC3 | 2.7 | 70 GPa |
| Magnesium-alloy Die-cast | AM60B | 1.8 | 44 GPa |

The magnesium alloy is lighter in weight than the aluminum alloy but much smaller in Young's modulus than the aluminum alloy. Because the Young's modulus influences an amount of bending or deflection, the magnesium alloy bends more greatly than the aluminum alloy in response to a same load. To limit the amount of bending to below a predetermined value, it is necessary to increase second moment of area. For that purpose, there is a need to further increase the thickness of the above-mentioned edge portion. However, if the thickness of the edge portion is increased, the seat frame would increase in overall weight and size, so that manufacturing cost of the seat frame would increase.

Further, if the edge portion is formed to project horizontally, water tends to accumulate on/in the upper surface of the horizontally projecting edge portion. Water accumulation on/in the upper surface of the horizontally projecting edge portion is undesirable in that corrosion is likely to occur in the edge portion. Such water accumulation is also undesirable from the viewpoint of operability.

Therefore, there has been a demand for a motorcycle seat rail where water is difficult to accumulate and which has a sufficient rigidity.

PRIOR ART LITERATURE

Patent Literature 1: Japanese Patent Application Laid-open Publication No. 2007-261587

SUMMARY OF INVENTION

Technical Problem

It is therefore an object to provide a motorcycle seat rail which is a magnesium-alloy die-cast seat rail, where water is difficult to accumulate, and which has a sufficient rigidity.

Solution to Problem

According to one aspect of the present invention, there is provided a seat rail of a motorcycle which includes a pair of left and right rail sections extending rearward from a vehicle body frame for supporting thereon a seat, the seat rail being a magnesium-alloy cast seat rail, each of the left and right rail sections having a first groove section formed in an upper inner side region thereof as viewed in a vehicle width direction and opening downward, and a second groove section formed in a lower, outer side region thereof as viewed in the vehicle width direction and opening upward, the second groove section having a drainage hole formed in a bottom portion thereof for draining accumulated water in a downward direction.

Preferably, each of the left and right rail sections has a lower surface, and an annular protruding portion formed integrally on the lower surface so as to surround a lower opening end of the drainage hole.

Preferably, the seat rail of the invention has a threaded through-hole for allowing another member to be fastened to the seat rail by means of a bolt, and which further has an increased-thickness portion formed thereon around the threaded through-hole such that the threaded through-hole has a length equal to two times a diameter of the through-hole plus a length in a range of 2 mm to 4 mm.

Preferably, the second groove section has an outer wall portion extending upward from an outer side region, in the vehicle width direction, of the bottom portion, and the outer wall portion has a boss formed integrally thereon so that the distal end of a push pin abuts against the boss at the time of mold release during manufacturing of the seat rail.

Preferably, the second groove section is segmented in a plurality of segmented groove portions, and the drainage hole is provided in each of the segmented groove portions in such a manner that the drainage hole is located at the lowermost position in the segmented groove portion in a state where the seat rail is mounted in place on the vehicle body in a slanting posture.

Advantageous Effects of Invention

According to the present invention, the first groove section opening downward is provided in an upper region of each of the rail sections, and the second groove section opening upward is provided in a lower region of each of the rail sections. It is known that a groove-shaped sectional configuration has a particularly great section modulus and second moment of area as compared to a rectangular sectional configuration. Each of the rail sections, where such groove-shaped sectional configurations are disposed in vertically-spaded-apart relation to each other, has a great bending rigidity and deflection rigidity as a whole. Namely, even when the seat rail bends due to a load applied from above, stress produced in a lower region of the rail section can be lowered below an acceptable value because the rail section has a great rigidity. In addition, through the drainage hole, water accumulating on/in the second groove section can be promptly drained from the second groove section, so that occurrence of galvanic corrosion can be suppressed.

The annular protruding portion is formed integrally on the lower surface so as to surround the lower opening end of the drainage hole. When the seat rail bends due to a load applied from above, stress may concentrate in a region around the drainage hole. However, because that region is reinforced by being formed as the annular protruding portion, it is possible to sufficiently lower the stress level.

The increased-thickness portion is formed around the threaded through-hole such that the threaded through-hole has a length equal to two times the diameter of the through-hole plus a length in a range of 2 mm to 4 mm. JIS B 1181 prescribes that a nut made of carbon steel should have a thickness that is about 85% of the diameter of a threaded hole. A magnesium alloy is more liable to present a more noticeable permanent strain due to heating than other metals. As measures against such a permanent strain, the seat rail of the invention has the increased-thickness portion around the threaded through-hole such that the length of the threaded through-hole is equal to two times the diameter of the through-hole plus a length in the range of 2 mm to 4 mm. Further, if a distal end portion of the bolt projects out of the threaded through-hole, galvanic corrosion may occur in the projecting portion. Thus, in the present invention, the length of the threaded through-hole is set to be equal to two times the diameter of the through-hole plus a length in the range of 2 mm to 4 mm as noted above, so that a sufficient axial force can be secured.

The outer wall portion has a boss formed integrally thereon so that the distal end of a push pin abuts against the boss at the time of mold release. The provision of the boss can achieve an enhanced mold release performance. At the same time, the outer wall portion can be reduced in thickness in the other region than the boss, and thus, the second groove section can be reduced in thickness and weight as a whole.

Because the second groove section is segmented in a plurality of segmented groove portions, the groove section can have an increased rigidity in the width direction of the groove section. In addition, because the drainage hole provided in each of the segmented groove portions is located at the lowermost position in the segmented groove portion in a state where the seat rail is mounted in place on the vehicle body in a slanting posture, water can be caused to drop reliably from each of the groove portions. Namely, the second groove section in the present invention is constructed to reliably drop water while securing necessary rigidity of the groove section.

BRIEF DESCRIPTION OF DRAWINGS

FIG. 4 is a graph showing results of a corrosion test;

FIG. 14 is a sectional view showing behavior of the push pins.

DESCRIPTION OF EMBODIMENTS

A description will be given about preferred embodiments of the present invention with reference to the accompanying drawings.

Figure 1:
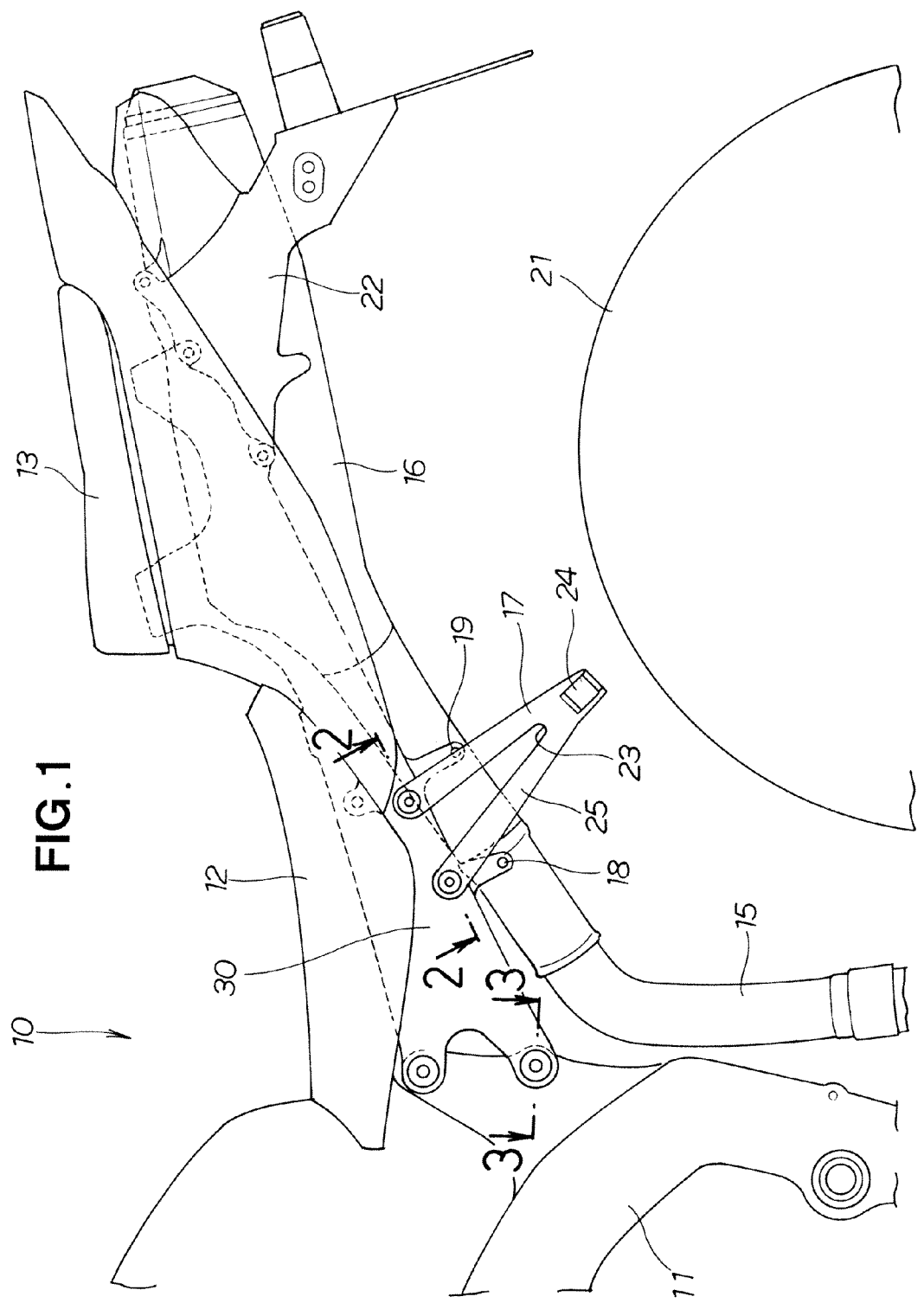
FIG. 1 is a side view showing a rear section of a motorcycle provided with a seat rail of the present invention.

As shown in FIG. 1, a seat rail 30 of the present invention, which is constructed to support thereon a driver's seat 12 and a pillion passenger's seat 13, is fixedly mounted to a vehicle body frame 11 of a motorcycle 10 so as to extend rearward from the vehicle body frame 11. An exhaust pipe 15 and muffler 16 are disposed beneath the seat rail 30. Thus, the seat rail 30 tends to assume relatively high temperatures.

The seat rail 30 is made by casting a magnesium alloy that, for example, consists of Al making up 5.5-6.5%, Mn making up 0.24-0.6%, Zn making up 0.22% or less, Si making up 0.1% or less, RE making up 0.2% or over, minute amounts of Cu, Ni and Fe, with the remaining percentage being Mg.

Further, a pillion step holder 17 extends downward from a portion of the seat rail 30 located forward of the middle of the seat rail 30. A heat-shield-plate rubber mount fastening portion 18 of a muffler and a reserve tank mounting portion 19 of a rear brake master cylinder extend from the bottom of the seat rail 30.

A rear fender is provided over a rear wheel 21, and this rear fender comprises a front portion 47 (FIG. 6) and a rear portion 22.

Figure 2:
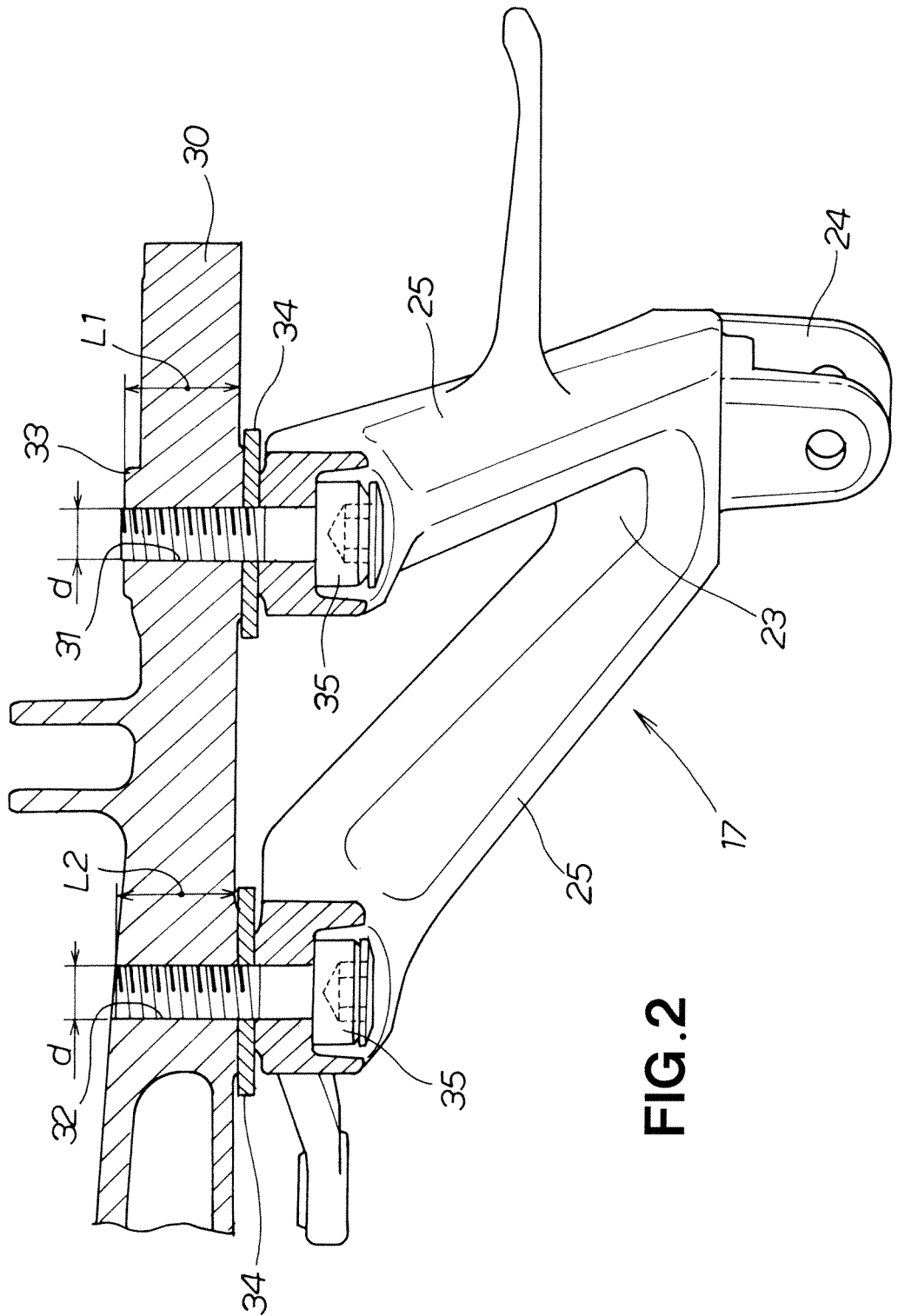
FIG. 2 is a sectional view taken along line 2-2 of FIG. 1.

As shown in FIG. 2, the pillion step holder 17 of a V shape, which is a die-cast member, includes a step mounting portion 24 located in a valley portion 23 thereof, and two leg portions 25 extending upward from the valley portion 23.

The seat rail 30 has two threaded through-holes 31 and 32, and a region around one of the threaded through-holes 31 is formed as an increased-thickness portion 33 such that the threaded through-hole 31 has a length equal to two times a diameter d of the through-hole 31 plus a length in a range of 2 mm to 4 mm. Namely, in order to have an increased total thickness, the seat rail 30 has the increased-thickness portion 33 integrally formed thereon around the through-hole 31. The other threaded through-hole 32 per se has a length L2 equal to two times a diameter d of the through-hole 32 plus a length in a range of 2 mm to 4 mm. Namely, because the seat rail 30 has, around the through-hole 32, an increased thickness equal to two times the diameter d of the through-hole 32 plus a length in the range of 2 mm to 4 mm, no increased-thickness portion 33 is formed around the through-hole 32.

The pillion step holder 17 is fixed to the seat rail 30 by the leg portions 25 being abutted against the underside of the seat rail 30 via alumite-coated washers 34 and by chrome-plated bolts 35 being screwed into the threaded through-holes 31 and 32. Because alumite has $Al_2O_3$ as its main component, it has electric insulating performance. Thus, the alumite-coated washers 34 can serve to prevent galvanic corrosion between the seat rail 30 and the pillion step holder 17 that is a separate member from the seat rail 30.

JIS B 1180 prescribes that a nut made of carbon steel should have a thickness that is about 85% of a diameter of a threaded hole. Namely, if the nut and the threaded hole are each made of carbon steel, the threaded hole only need have a length that is about 0.85 times the diameter of the threaded hole.

A magnesium alloy is more liable to present a more noticeable permanent strain due to heating than other metals. As measures against such a permanent strain, the seat rail 30 has the increased-thickness portion 33 around the threaded through-hole 31 in such a manner that the length L1 of the threaded through-hole 31 is equal to two times the diameter d of the through-hole 31 plus a length in the range of 2 mm to 4 mm.

If the seat frame 30 is made of the magnesium alloy and the plated bolts 35 are made of chrome-plated steel, and if water is present between the seat frame 30 and any of the plated bolts 35, galvanic corrosion would occur, because the seat frame 30 and the plated bolts 35 are made of different materials.

The inventors of the present invention conducted an experiment to find that the galvanic corrosion between the seat frame 30 and the plated bolt 35 is below 2 mm at most.

As measures against such galvanic corrosion, the lengths L1 and L2 of the threaded through-holes 31 and 32 are each set to equal two times the diameter d of the through-hole 31 or 32 plus a length in the range of 2 mm to 4 mm. Thus, even where some galvanic corrosion has occurred, the length L1 of the threaded through-hole 31 can secure a bearing width two times the hole diameter d. Namely, with the lengths L1 and L2 of the threaded through-holes 31 and 32 set appropriately, it is possible to achieve two advantageous benefits, i.e. securement of necessary screw-fastening performance and galvanic corrosion measures. Note that the thickness of the increased-thickness portion 33 only need be set such that the length of the threaded through-hole 31 is equal to or greater than two times the diameter d of the through-hole 31 (i.e., 2d+2 mm), more preferably (2d+a value in the range of from 2 mm to 4 mm).

Figure 3:
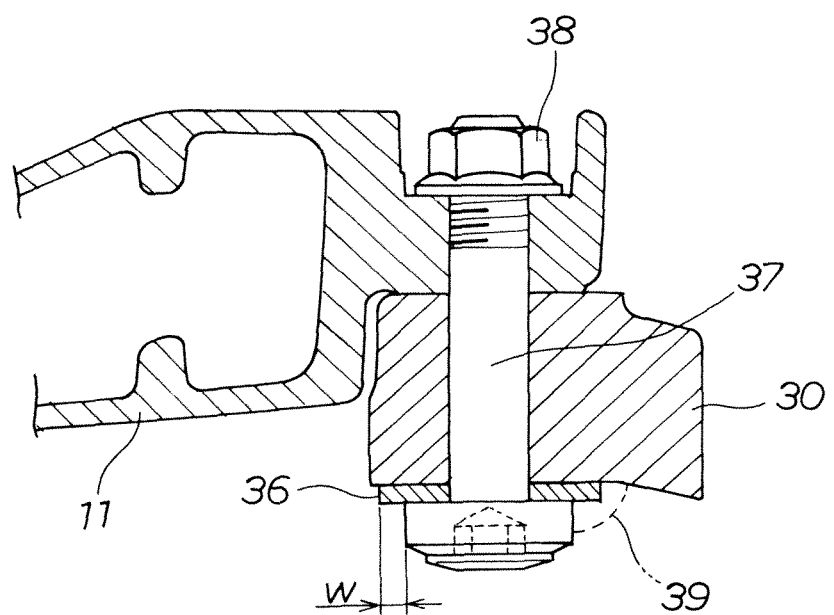
FIG. 3 is a sectional view taken along line 3-3 of FIG. 1.

As shown in FIG. 3, a distal end portion of the seat rail 30 is lapped on the vehicle body frame 11 made by casting, and a plated bolt 37 is passed through the distal end portion of the seat rail 30 and vehicle body frame 11 via an alumite-coated washer 36 of a 2.5 mm thickness. Then, a distal end portion of the plated bolt 37 is screwed into a nut 38, to thereby fix the seat rail 30 to the vehicle body frame 11.

Because the plated bolt 37 made of chrome-plated steel and the seat rail 30 made of the magnesium alloy are of different materials, unwanted galvanic corrosion could occur. Thus, the alumite-coated washer 36 is disposed between the plated bolt 37 and the seat rail 30, to electrically insulate between the plated bolt 37 and the seat rail 30. However, if a water drop 39 lies astride between the head of the plated bolt 37 and the seat rail 30 as indicated by imaginary line, galvanic corrosion might occur. Therefore, the outer diameter of the alumite-coated washer 36, i.e. dimension w, becomes important.

The inventors etc. conducted a CCT (combined cyclic corrosion test), focusing on the distance w between the outer periphery of the alumite-coated washer 36 and the outer periphery of the plated bolt 37. Results of the test are shown in graphs of (a) and (b) of FIG. 4.

In (a) of FIG. 4, the horizontal axis represents the number of cycles of the combined CCT ("number of CCT cycles"), while the vertical axis represents an amount of corrosion (i.e., corrosion loss depth). Where the distance w is 0.5 mm, the amount of corrosion exceeds 600 μm. Where the distance w is 1.5 mm, the amount of corrosion stays at 250 μm. Further, where the distance w is 2.5 mm, the amount of corrosion is not much different from that in the case where the distance w is 1.5 mm.

The inventors etc. further examined correlationship between the dimension w and the thickness of the alumite-coated washer, results of which were shown in the graph of (b) of FIG. 4.

In (b) of FIG. 4, the horizontal axis represents the thickness of the alumite-coated washer, while the vertical axis represents the dimension w. It could be confirmed that, where the thickness of the alumite-coated washer 36 is 1.0 mm, a small-large boundary of the corrosion amount exists at a point where the dimension w is 3.5 mm, and that, where the thickness of the alumite-coated washer 36 is 2.5 mm, the small-large boundary of the corrosion amount exists at a point where the dimension w is 1.5 mm. For example, by setting the thickness of the alumite-coated washer at 2 mm and setting the dimension w at 3 mm, it is possible to limit the corrosion of the alumite-coated washer within a small corrosion amount region, as indicated by broken line. Namely, by selecting (designing) a thickness of the alumite-coated washer 36 and a dimension w such that the amount of corrosion of the alumite-coated washer can fall within the small corrosion amount region, it is possible to suppress galvanic corrosion.

Figure 5:
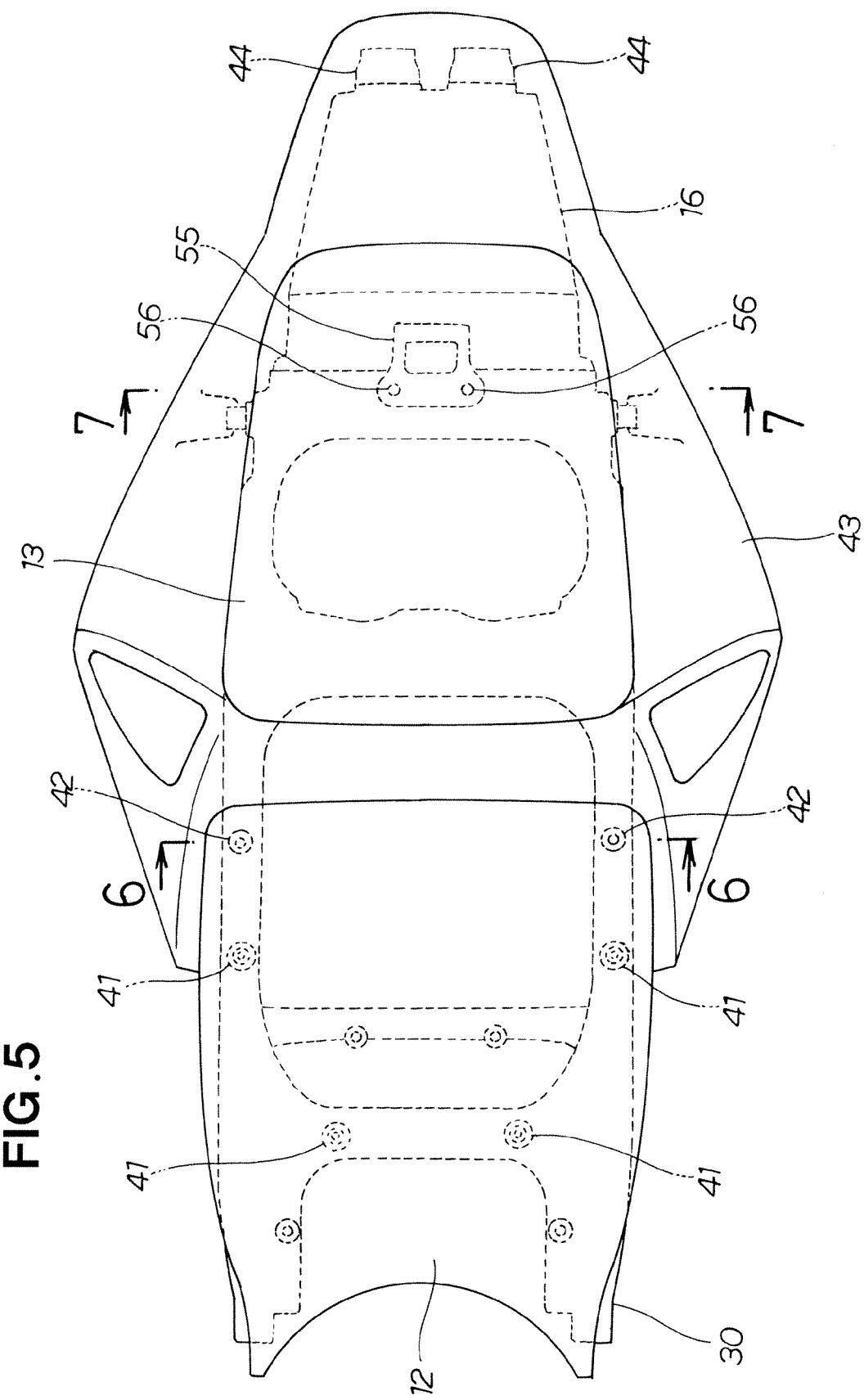
FIG. 5 is a plan view of the rear section of the motorcycle provided with the seat rail of the present invention.

As shown in FIG. 5, the driver's seat 12 is placed on the seat rail 30, indicated by broken line, via four cushion rubbers 41, and the driver's seat 12 is fastened to the seat rail 30 by means of a plurality of bolts 42. The pillion passenger's seat 13 located behind the driver's seat 12 is surrounded by a rear cowl 43, and the muffler 16 having left and right tail pipes 44 are accommodated inside the rear cowl 43.

Figure 6:
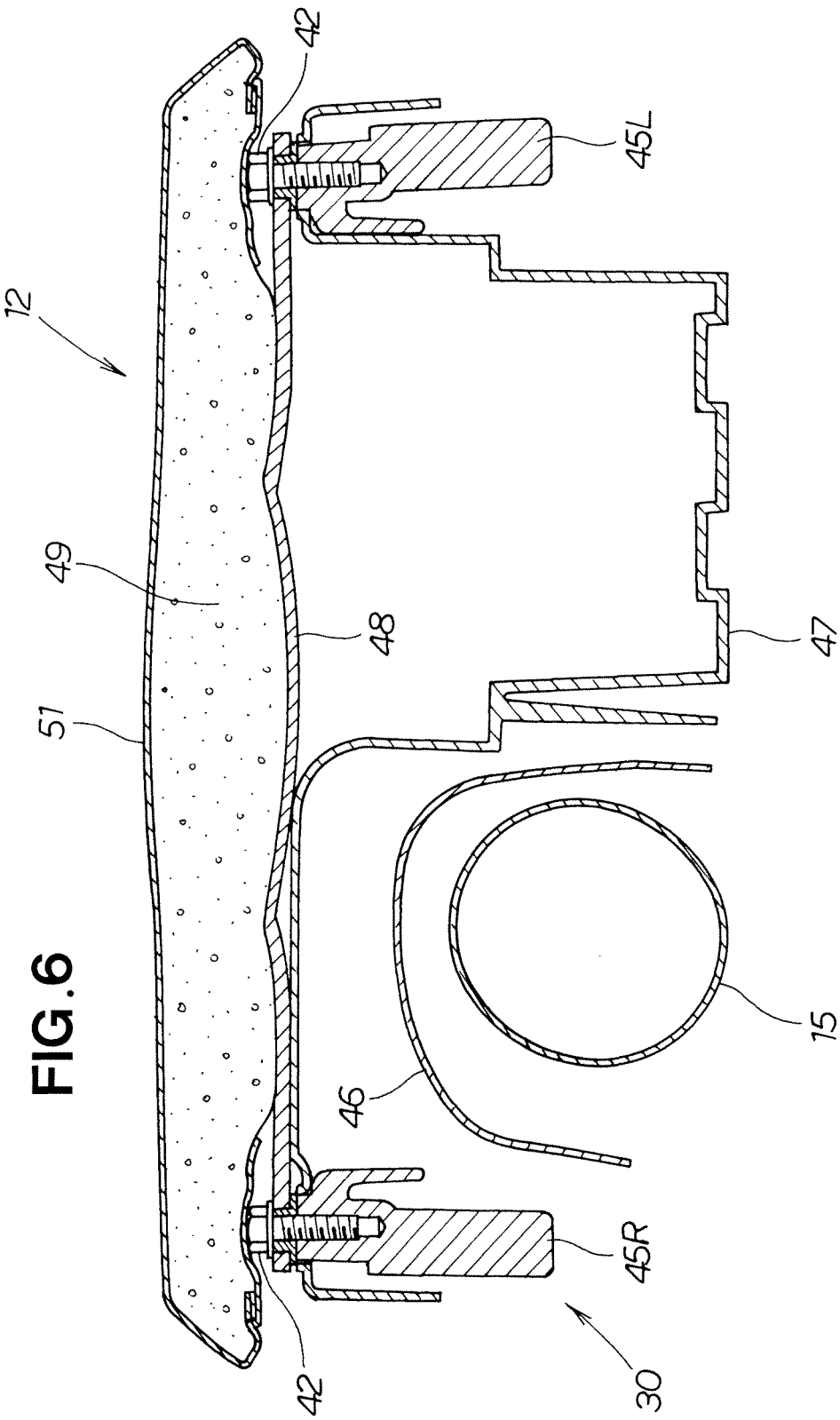
FIG. 6 is a sectional view taken along line 6-6 of FIG. 5.

As shown in FIG. 6, the seat rail 30 includes a pair of a left rail section 45L and a right rail section 45R. The exhaust pipe 15 and heat shield plate 46 are disposed between the left rail section 45L and the right rail section 45R and closer to the right rail section 45R, the front portion 47 of the rear fender spans between the left rail section 45L and the right rail section 45R, and the driver's seat 12 is placed on the front portion 47 of the rear fender.

The driver's seat 12 includes a seat bottom plate 48, a cushion material 49 placed on the seat bottom plate 48, and a seat skin 51 wrapping the cushion material 49. The seat bottom plate 48 is fastened to the left and right rail sections 45L and 45R by means of bolts 42, so that the driver's seat 12 is fixed to the seat rail 30. As shown, the front portion 47 of the rear fender is kept pressed downward by the seat bottom plate 48 in such a manner that it does not float up beyond the seat rail 30. Attachment/detachment of the bolts 42 can be facilitated by left and right end portions of the driver's seat 12 being pushed up as necessary.

Figure 7:
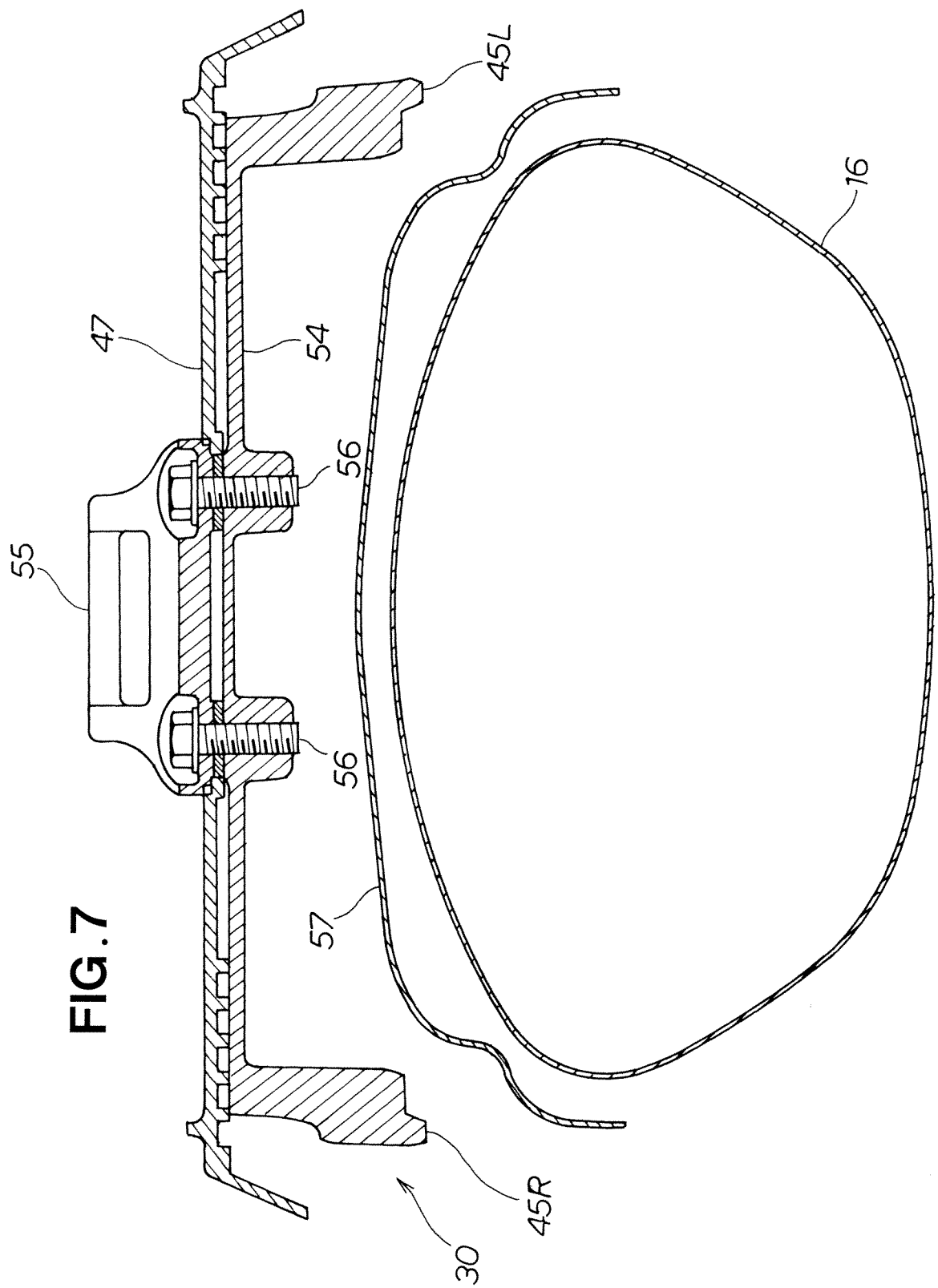
FIG. 7 is a sectional view taken along line 7-7 of FIG. 5.

As shown in FIG. 7, the left rail section 45L and the right rail section 45R are interconnected via a fourth cross section 54 with the front portion 47 of the rear fender placed thereon, and a seat hook engaging member 55 is fastened to middle portions of the front portion 47 and fourth cross section 54 by means of bolts 56. As shown in FIG. 5, the seat hook engaging member 55 is a member for supporting the pillion passenger seat 13, and the seat hook engaging member 55 also functions to keep the front portion 47 and fourth cross section 54 pressed so as not to lift up beyond the fourth cross section 54. A heat shield cover 57 is placed over the upper surface of the muffler 16.

The following describe in more detail the seat rail 30.

Figure 8:
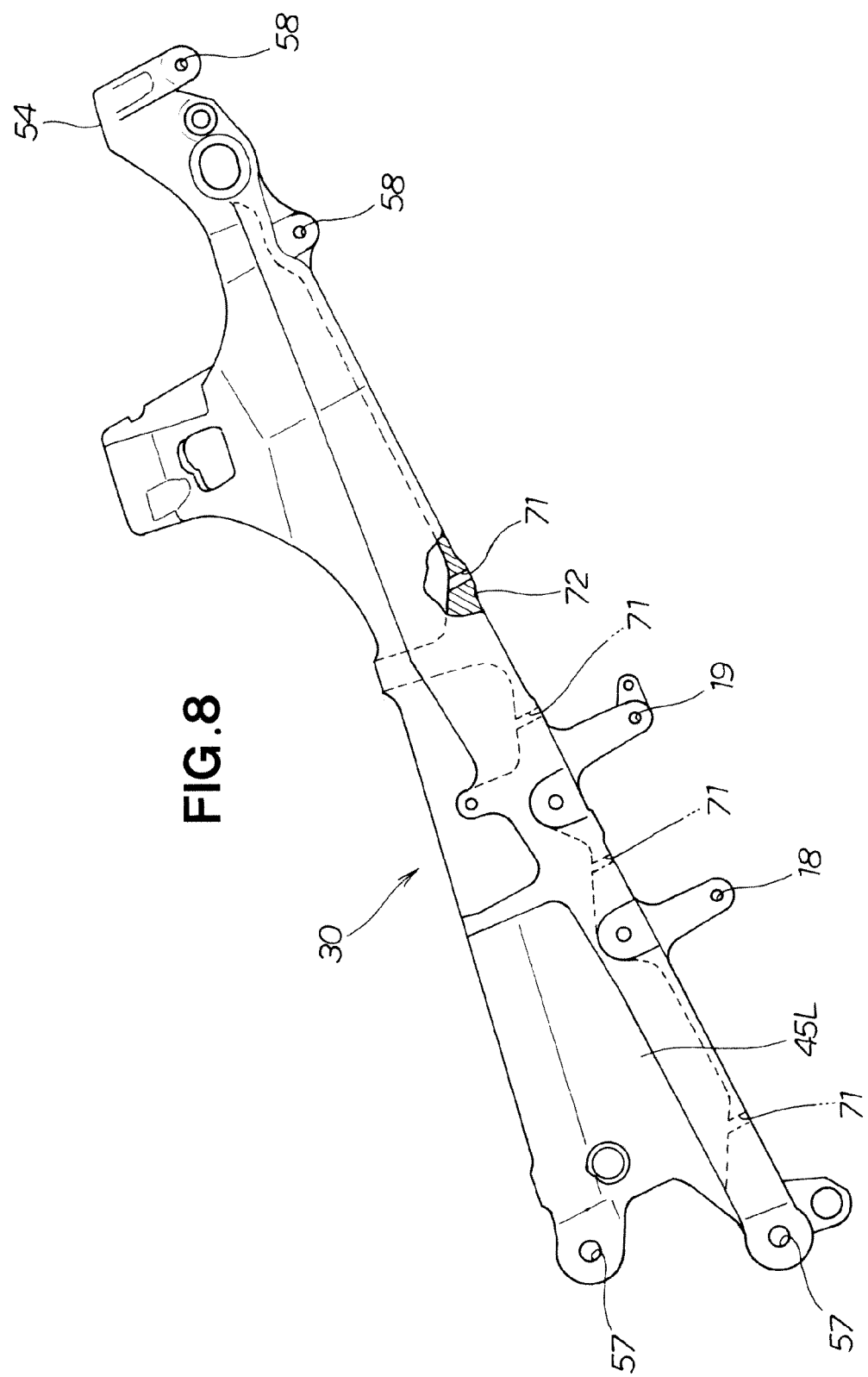
FIG. 8 is a side view of the seat rail.

Referring to FIG. 8, the seat rail 30 is a magnesium-alloy die-cast seat rail having a generally triangular shape as viewed in side elevation. The seat rail 30 has bolt holes 57 formed in its front end portions, and bolt holes 58 formed in its rear end portions for fastening the rear portion 22 (FIG. 1) of the rear fender to the rear end portions.

Figure 9:
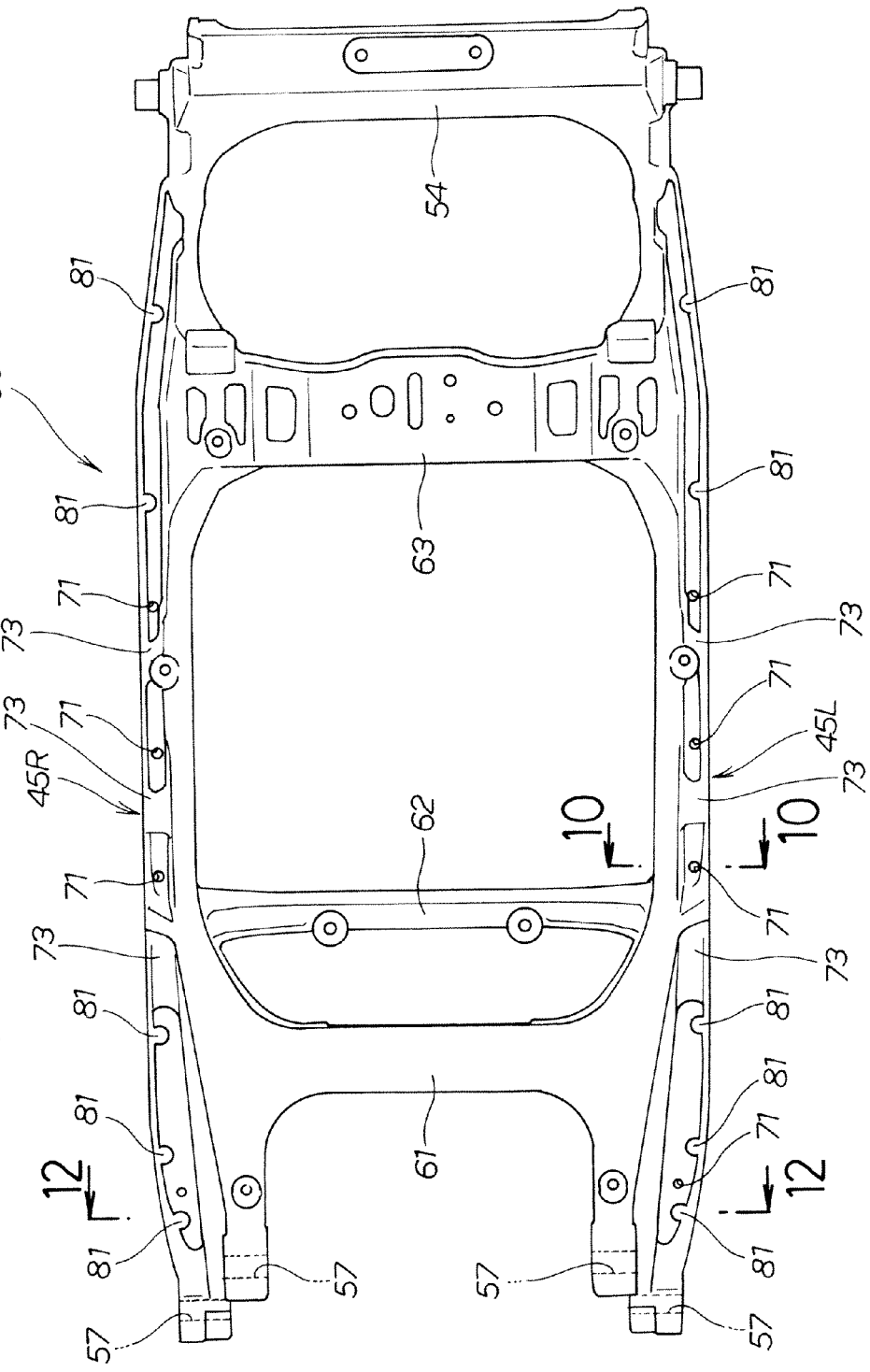
FIG. 9 is a plan view of the seat rail shown in FIG. 8.

Further, as shown in FIG. 9, the seat rail 30 is a generally ladder-shaped rail in where the left rail section 45L and the right rail section 45R are interconnected via first to fourth cross sections 61, 62, 63 and 64. Such a seat rail 30 will be described below in greater detail.

Figure 10:
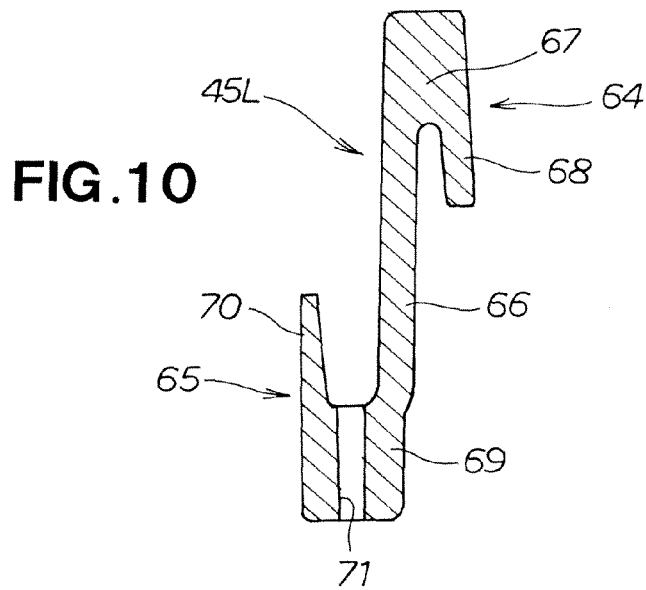
FIG. 10 is a sectional view taken along line 10-10 of FIG. 9.

Referring to FIG. 10, the left rail section 45L has: a first groove section 64 formed in its upper, inner side region as viewed in a vehicle width direction right side region in FIG. 10 and opening downward; and a second groove section 65 formed in its lower, outer side region as viewed in the vehicle width direction (left side in FIG. 10) and opening upward. Namely, the first groove section 64 includes an upper end portion 67 extending inward in the vehicle width direction from the upper end of a main, vertical wall portion 66, and an inner wall portion 68 extending downward from the upper end portion 67.

The second groove section 65 includes a bottom portion 69 extending outward in the vehicle width direction from the lower end of the vertical wall portion 66, and an outer wall portion 70 extending upward from the bottom portion 69. Although not particularly described here, the right rail section 45R has a sectional structure similar to the above-described sectional structure of the first groove section 64.

It is known that a groove-shaped sectional configuration has a particularly great section modulus and second moment of area as compared to a rectangular sectional configuration. The rail section 45L, where such groove-shaped sectional configurations (groove sections 64 and 65) are disposed in vertically-spaded-apart relation to each other, has a great bending rigidity and deflection rigidity as a whole. Namely, even when the seat rail 30 (FIG. 9) bends due to a load applied from above, stress produced in a lower region of the rail section 45L can be lowered below an acceptable value because the rail section 45L has a great rigidity.

Further, the bottom portion 69 of the second groove section 65 has a drainage hole 71 formed therethrough. Through the drainage hole 71, water accumulating on/in the second groove section 65 can be promptly drained from the second groove section 65, so that occurrence of galvanic corrosion can be suppressed.

Referring again to FIG. 8, the rail section 45L has an annular protruding portion 72 formed integrally on the lower surface thereof so as to surround the lower opening end of the drainage hole 71. When the seat rail 30 bends due to a load applied from above, stress may concentrate in a region around the drainage hole 71. However, because that region is reinforced by being formed as the annular protruding portion 72, it is possible to sufficiently lower the stress level.

In addition, as shown in FIG. 9, the second groove section 65 is segmented in four groove portions by a plurality of, e.g. three, ribs 73 formed on one side thereof. By the reinforcing function of the ribs 73, the second groove section 65 can have an increased rigidity in its width direction. The above-mentioned drainage hole 71 is provided in each of the segmented groove portions. In each of the segmented groove portions of the groove section 65, as shown in FIG. 8, the drainage hole 71 is located at the lowermost position in the segmented groove portion in a state where the seat rail is mounted in place on the vehicle body in a slanting posture. In this way, water can be caused to drop reliably from each of the segmented groove portions of the groove section 65.

Figure 11:
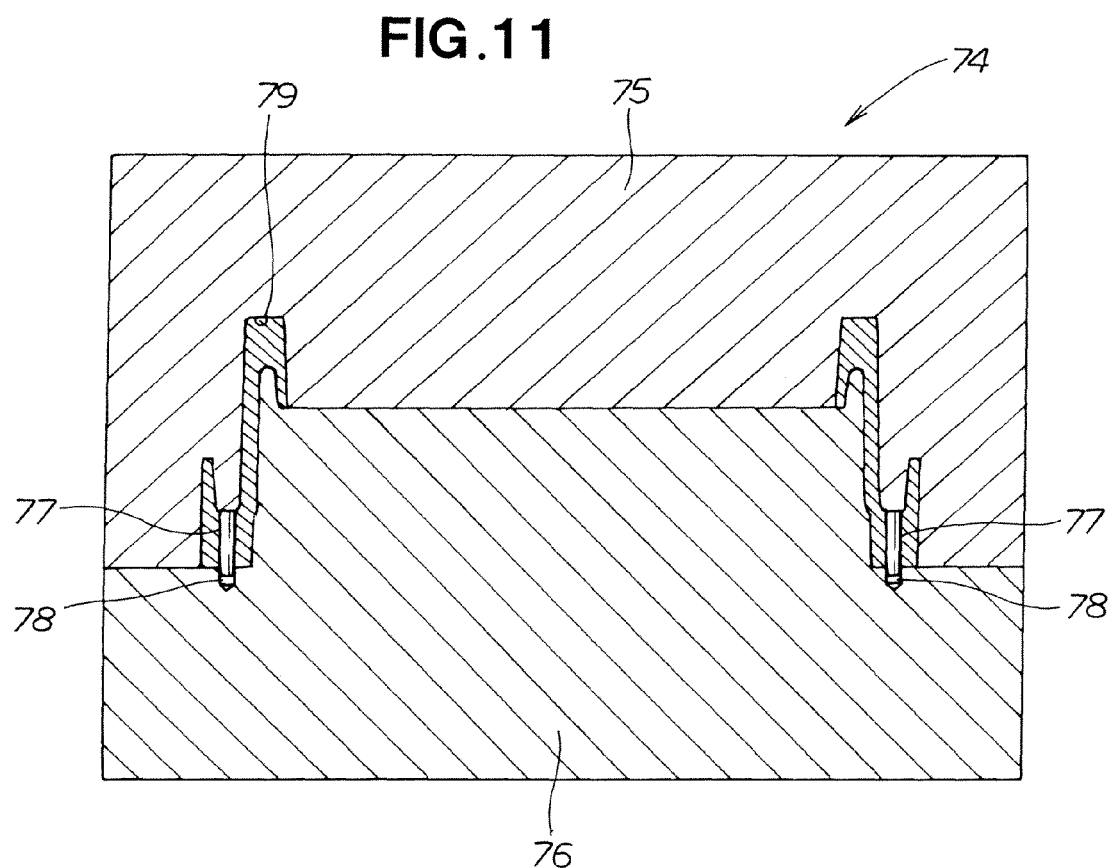
FIG. 11 is a sectional view of a die-cast mold including core pins.

FIG. 11 shows a die-cast mold including core pins. The die-cast mold 74 comprises a fixed mold 75 and a movable mold 76 movable relative to the fixed mold 75. The core pins 77, each having a tapering shape, are provided on the fixed mold 75, and the movable mold 76 has recessed portions 78 for receiving respective distal ends of the core pins 77. After mold clamping, high-pressure magnesium alloy melt is poured into a cavity 79, and the movable mold 76 is separated or detached from the fixed mold 75 after the magnesium alloy melt has coagulated. Because the core pins 77 are left on the fixed mold 75, the movable mold 76 is detached from the fixed mold 75 with the cast, having an opening formed therein as the drainage hole 71, attached to the movable mold 76.

Figure 12:
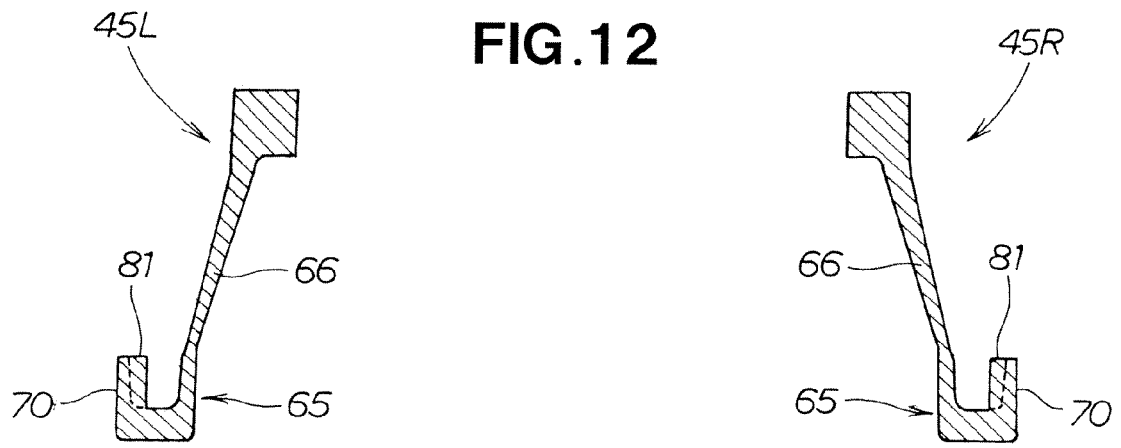
FIG. 12 is a sectional view taken along line 12-12 of FIG. 9.

As shown in FIG. 12, a plurality of bosses (five bosses in the instant embodiment) 81 (see also FIG. 9) are formed integrally on and along the outer wall portion 70 of the second groove section 65. The outer wall portion 70 has a relatively small thickness, and only the bosses 81 project locally toward the vertical wall portion 66. Because the outer wall portion 70 has a relatively small thickness, the seat rail will not become heavy in weight. These bosses 81 are very helpful in separating the molds 75 and 76 from each other.

Figure 13:
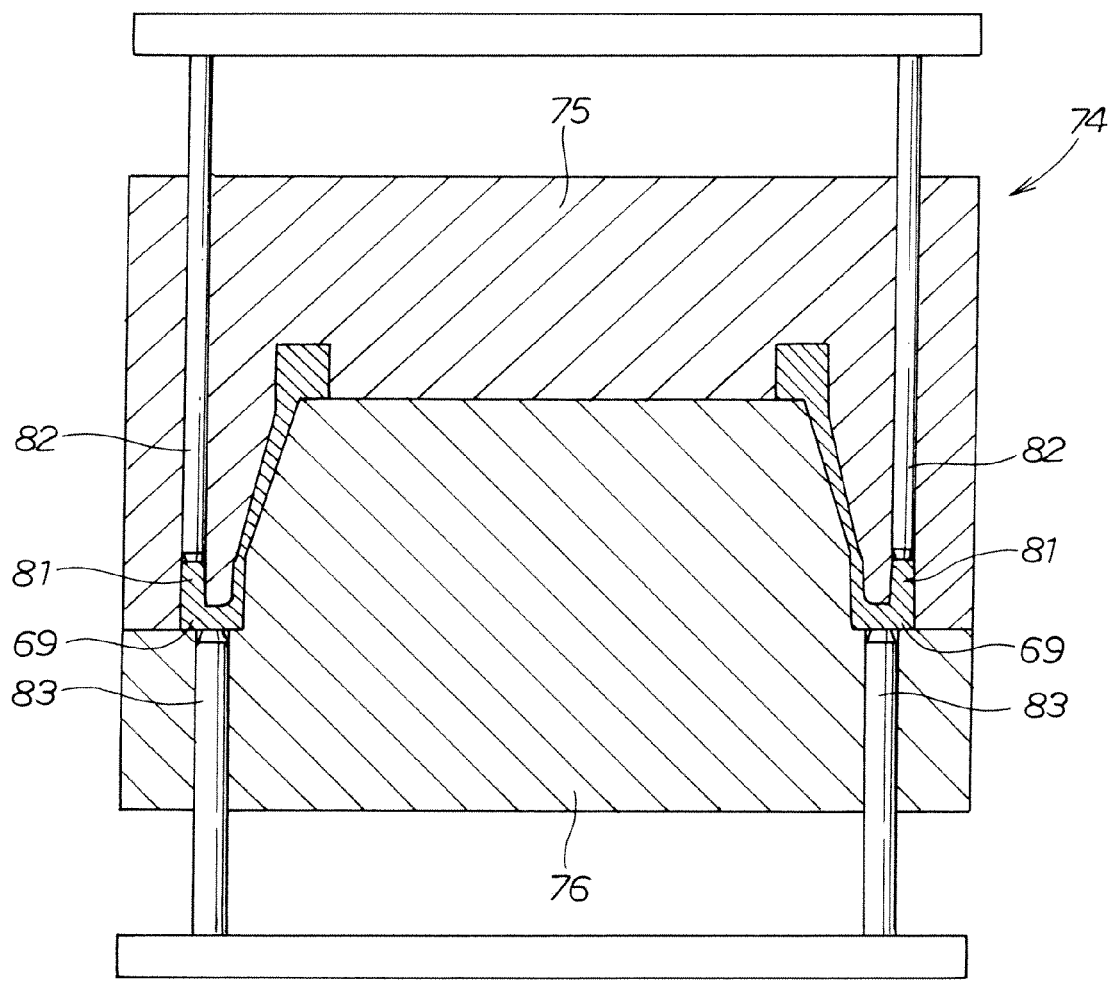
FIG. 13 is a sectional view of a die-cast mold including push pins.

FIG. 13 shows a die-cast mold including push pins. The die-cast mold 74 shown in FIG. 13 includes first push pins 82 provided on the fixed mold 75 for being opposed to the bosses 81, and second push pins 83 provided on the movable mold 76 for pushing the bottom portions 69.

When the movable mol 76 is to be detached from the fixed mold 75, as shown in (a) of FIG. 14, the bosses 81 are pushed by the first push pins 82. Then, die-cast items 84 can be smoothly detached from the fixed mold 75 together with the movable mol 76 without being left on the fixed mold 75.

Then, as shown in (b) of FIG. 14, the die-cast items 84 can be detached from the movable mol 76 by being pushed by the second push pins 83. The thus-obtained die-cast items 84 are subjected to additional processing, such as machine work, to thereby provide the seat rail 30 shown in FIG. 9.

Whereas it is preferable that the seat rail be made by die-casting, the seat rail may be made by any other desired type of casting, such as gravity die-casting or metal mold casting or sand mold casting.

Whereas the above-described embodiment of the seat rail is designed to collectively support thereon the driver's seat and pillion passenger's seat, the seat rail of the present invention may be constructed to support thereon only the driver's seat. Namely, the number of seats to be supported on the seat rail of the present invention is not limited to a particular number.

INDUSTRIAL APPLICABILITY

The seat rail of the present invention is preferably a magnesium-alloy cast seat rail.

| Legend | |
|---|---|
| 10 | motorcycle |
| 11 | vehicle body frame |
| 12 | seat (driver's seat) |
| 13 | seat (pillion passenger's seat) |
| 17 | pillion step holder |
| 30 | seat rail |
| 31 | threaded through-hole |
| 35 | bolt (chrome-plated bolt) |
| 64 | first groove section |
| 65 | second groove section |
| 69 | bottom portion |
| 70 | outer wall portion |
| 71 | drainage hole |
| 72 | annular protruding portion |
| 81 | boss |
| 82 | push pin (first push pin) |
| 84 | die-cast item |
| d | diameter of the threaded through-hole |
| L1 | length of the threaded through-hole |

The invention claimed is:

1. A seat rail (30) of a motorcycle which includes a pair of left and right rail sections (45L, 45R) extending rearward from a vehicle body frame (11) for supporting thereon a seat (12, 13), the seat rail being a magnesium-alloy cast seat rail, each of the left and right rail sections having a first groove section (64) formed in an upper inner side region thereof as viewed in a vehicle width direction and opening downward, and a second groove section (65) formed in a lower, outer side region thereof as viewed in the vehicle width direction and opening upward, the second groove section having a drainage hole (71) formed in a bottom portion (69) thereof for draining accumulated water in a downward direction, each of the left and right rail sections having a lower surface, and an annular protruding portion (72) formed integrally on the lower surface so as to surround a lower opening end of the drainage hole, the second groove section having an outer wall portion (70) extending upward from an outer side region, in the vehicle width direction, of the bottom portion, the outer wall portion having a boss (81) formed integrally thereon so that a distal end of a push pin (82) abuts against the boss at a time of mold release during manufacturing of the seat rail.

2. The seat rail according to claim 1, which has a threaded through-hole (31, 32) for allowing another member to be fastened to the seat rail by means of a bolt, and which further has an increased-thickness portion (33) formed thereon around the threaded through-hole such that the threaded through-hole has a length equal to two times a diameter of the through-hole plus a length in a range of 2 mm to 4 mm.

3. The seat rail according to claim 1, wherein the second groove section is segmented in a plurality of segmented groove portions, and the drainage hole is provided in each of the segmented groove portions in such a manner that the drainage hole is located at a lowermost position in the segmented groove portion when the seat rail is mounted in place on the vehicle body in a slanting posture.

* * * * *